(12) United States Patent
Burghardt et al.

(10) Patent No.: US 8,752,430 B2
(45) Date of Patent: Jun. 17, 2014

(54) MICROMECHANICAL ACCELERATION SENSOR

(75) Inventors: Roland Burghardt, Frankfurt am Main (DE); Roland Hilser, Kirchheim Teck (DE); Bernhard Schmid, Friedberg (DE); Veith Albrecht, Heusenstamm (DE); Dirk Theobald, Eschborn (DE)

(73) Assignee: Continental Teves AG & Co. oHG (DE)

( * ) Notice: Subject to any disclaimer, the term of this patent is extended or adjusted under 35 U.S.C. 154(b) by 240 days.

(21) Appl. No.: 12/935,645

(22) PCT Filed: Apr. 3, 2009

(86) PCT No.: PCT/EP2009/054052
§ 371 (c)(1),
(2), (4) Date: Sep. 30, 2010

(87) PCT Pub. No.: WO2009/121971
PCT Pub. Date: Oct. 8, 2009

(65) Prior Publication Data
US 2011/0023606 A1    Feb. 3, 2011

(30) Foreign Application Priority Data
Apr. 3, 2008   (DE) .......................... 10 2008 017 156

(51) Int. Cl.
*G01P 15/125*   (2006.01)
*G01P 15/18*    (2013.01)

(52) U.S. Cl.
USPC ........................................ 73/514.32; 73/510

(58) Field of Classification Search
USPC ............ 73/514.32, 514.36, 514.38, 510, 511, 73/514.16
See application file for complete search history.

(56) References Cited

U.S. PATENT DOCUMENTS

| | | | | |
|---|---|---|---|---|
| 4,598,585 | A * | 7/1986 | Boxenhorn | 73/504.12 |
| 5,350,189 | A | 9/1994 | Tsuchitani et al. | |
| 5,962,786 | A * | 10/1999 | Le Traon et al. | 73/514.29 |
| 6,082,197 | A * | 7/2000 | Mizuno et al. | 73/514.36 |
| 6,122,965 | A | 9/2000 | Seidel et al. | |
| 6,761,070 | B2 * | 7/2004 | Zarabadi et al. | 73/514.32 |
| 6,845,670 | B1 * | 1/2005 | McNeil et al. | 73/514.32 |
| 7,004,025 | B2 * | 2/2006 | Tamura | 73/511 |

(Continued)

FOREIGN PATENT DOCUMENTS

| | | |
|---|---|---|
| DE | 4224383 A1 | 1/1993 |
| DE | 19649715 A1 | 6/1998 |

(Continued)

OTHER PUBLICATIONS

International Search Report for PCT Application No. PCT/EP2009/054052 mailed Aug. 4, 2009.

(Continued)

*Primary Examiner* — Helen Kwok
(74) *Attorney, Agent, or Firm* — RatnerPrestia

(57) ABSTRACT

A micromechanical acceleration sensor, including at least one substrate, one or more frames, at least a first frame of which is suspended directly or indirectly on the substrate by at least one spring element, and is deflected with respect to the substrate when at least a first acceleration acts, and at least a first seismic mass which is suspended on the first frame or an additional frame by at least one spring element, and is deflected with respect to this frame when an acceleration acts which is, in particular, different from the first acceleration.

16 Claims, 17 Drawing Sheets

(56) References Cited

U.S. PATENT DOCUMENTS

| | | | |
|---|---|---|---|
| 7,013,730 B2 * | 3/2006 | Malametz | 73/514.36 |
| 7,024,933 B2 * | 4/2006 | Malametz | 73/514.32 |
| 7,228,739 B2 * | 6/2007 | Campbell et al. | 73/514.32 |
| 7,258,012 B2 * | 8/2007 | Xie | 73/514.32 |
| 7,610,809 B2 * | 11/2009 | McNeil et al. | 73/514.32 |
| 7,779,689 B2 * | 8/2010 | Li et al. | 73/510 |
| 7,784,344 B2 * | 8/2010 | Pavelescu et al. | 73/514.32 |
| 8,186,221 B2 * | 5/2012 | Lin et al. | 73/514.32 |
| 8,261,614 B2 * | 9/2012 | Hartmann et al. | 73/504.12 |
| 2002/0144548 A1 * | 10/2002 | Cohn et al. | 73/514.16 |
| 2004/0025591 A1 * | 2/2004 | Yoshikawa et al. | 73/514.32 |
| 2004/0065151 A1 * | 4/2004 | Babala | 73/514.01 |
| 2004/0183149 A1 | 9/2004 | Schenk | |
| 2004/0231420 A1 * | 11/2004 | Xie et al. | 73/514.32 |
| 2005/0235751 A1 * | 10/2005 | Zarabadi et al. | 73/514.01 |
| 2006/0021436 A1 | 2/2006 | Kapser et al. | |
| 2007/0034007 A1 * | 2/2007 | Acar | 73/514.01 |
| 2010/0037690 A1 | 2/2010 | Günthner et al. | |

FOREIGN PATENT DOCUMENTS

| | | |
|---|---|---|
| DE | 19703832 A1 | 8/1998 |
| DE | 19750350 | 8/1999 |
| DE | 102006010103 A1 | 9/2007 |
| DE | 102007012163 A1 | 10/2007 |
| EP | 1410047 B1 | 2/2007 |
| FR | 2739190 | 3/1997 |
| JP | 2002318244 A | 10/2002 |
| WO | WO 03/104823 A1 | 12/2003 |

OTHER PUBLICATIONS

German Search Report for Application No. 10 2008 017 156.5 mailed Apr. 3, 2008.

* cited by examiner

MICROMECHANICAL ACCELERATION SENSOR

CROSS REFERENCE TO RELATED APPLICATIONS

This application is the U.S. national phase application of PCT International Application No. PCT/EP2009/054052, filed Apr. 3, 2009, which claims priority to German Patent Application No. 10 2008 017 156.5, filed Apr. 3, 2008, the content of such applications being incorporated by reference herein.

FIELD OF THE INVENTION

The invention relates to a micromechanical acceleration sensor, to a method for manufacturing an acceleration sensor, and to the use of the acceleration sensor in motor vehicles.

BACKGROUND OF THE INVENTION

Document WO 03/104823, which is incorporated by reference, proposes a micromechanical capacitive acceleration sensor for detecting accelerations in a plurality of spatial directions, which comprises a plurality of seismic masses with torsion suspensions which are oriented differently with respect to one another, wherein the seismic masses are each suspended eccentrically with respect to their center of gravity. This acceleration sensor is relatively well suited to detecting accelerations which are relatively small in absolute value, but it is less well suited to detecting accelerations which are relatively large in absolute value.

SUMMARY OF THE INVENTION

An object of the present invention is to propose a micromechanical acceleration sensor which can detect relatively precisely at least two different accelerations which differ significantly at least in absolute value, and at the same time is in particular relatively cost-effective.

The object is achieved according to aspects of the invention by means of the acceleration sensor and the method for manufacturing an acceleration sensor that are described herein.

The invention relates to the idea of integrating at least two different component acceleration sensor elements in one micromechanical sensor by at least partially decoupling the latter by means of at least one frame which is expediently itself part of at least one of the component acceleration sensor elements.

The acceleration sensor is expediently configured in such a way that as a result of the deflection of the first frame relative to the substrate it is possible to detect relatively precisely accelerations which are greater in absolute value than 25 g, and in this context accelerations which are less than 10 g can be detected relatively precisely as a result of the deflection of at least the first seismic mass relative to the frame on which said mass is suspended. In particular, an airbag sensor component element is implemented as a first component acceleration sensor element by the first frame and indirectly by the components which are mounted or suspended thereon, and a second component acceleration sensor element for an electronic stability program (ESP) is implemented by the first seismic mass.

The acceleration sensor according to aspects of the invention additionally has the advantage that, by means of the at least one frame, essentially decoupled detection of accelerations in different directions can be additionally carried out relatively precisely and easily.

A substrate is understood to be a base body and/or a carrier body and/or housing component of the acceleration sensor which is in particular an essentially unstructured part of the wafer from which the acceleration sensor is constructed. The substrate is particularly preferably composed of crystalline or polycrystalline silicon or of one or more layers of semiconductor material and/or metal/metals.

The substrate is expediently embodied as an external frame of the acceleration sensor. A frame is preferably understood to be an open and/or closed frame which in particular surrounds one or more seismic masses or an additional frame at least on three sides, and particularly preferably has an essentially rectangular internal circumference and external circumference. Quite particularly preferably, the frame encloses at least partially at least one seismic mass in relation to one plane.

A spring element is preferably understood to be a torsion spring element or a bending spring element or a spring element which is constructed so as to be both flexible and also twistable.

At least the first seismic mass is preferably suspended on the first or an additional frame by means of at least one torsion spring, wherein this torsion spring is constructed so as to be, in particular, rigid with respect to translatory deflections, and as a result brings about decoupling of the deflection of the seismic mass relative to the frame from the deflection of the frame relative to the substrate or an additional frame. Alternatively, the at least one seismic mass is preferably suspended on bending springs.

It is preferred that at least one frame is suspended on another frame or the substrate by means of at least one torsion spring. In particular, the acceleration sensor has an additional frame which is suspended on the first frame by means of at least one torsion spring, wherein the at least one seismic mass is suspended on the additional frame by means of at least one other torsion spring. The additional frame is particularly preferably suspended so as to be twistable about the y axis, and the at least one seismic mass about the x axis. As a result, the seismic mass can be deflected rotationally about the x axis and about the y axis in its entirety with respect to the substrate. The seismic mass is very particularly preferably suspended eccentrically here with respect to its mass center of gravity, as a result of which accelerations in the x direction and y direction can be detected. In addition, the acceleration sensor expediently has for this purpose four electrodes which are assigned to the at least one seismic mass.

At least the first seismic mass is preferably suspended eccentrically with respect to its mass center of gravity. As a result, the sensitive direction, that is to say the direction in which an acceleration can be detected, is different from the direction of the deflection of this seismic mass.

It is expedient that the at least first seismic mass, in particular all the seismic masses, has/have a center of gravity which lies in the z direction outside the plane spanned by the respective associated frame and/or outside the right parallelepiped. One side of the first seismic mass, or of each seismic mass, very particularly preferably the lower side, is particularly preferably of convex design in the z direction. Alternatively or additionally, at least the first seismic mass is in particular constructed so as to be cuboidal or in the form of a parallelepiped or truncated cone or in the form of a truncated pyramid.

The first frame is preferably suspended in such a way that the deflection which is caused by the first acceleration has a direction which is essentially parallel to the torsion axis of the torsion suspension of the at least first seismic mass.

It is preferred that the base surface of the substrate is oriented parallel to the x-y plane of a Cartesian coordinate system, and the first frame is suspended on the substrate such that it can be deflected in the x direction or y direction, wherein the first seismic mass is suspended on the first frame or an additional frame such that it can be deflected at least in the z direction, and the acceleration sensor has at least two electrodes which are substantially in particular plate-shaped, are arranged essentially parallel to the x-y plane and are assigned to the first seismic mass as a reading device. The electrodes are particularly preferably arranged in the z direction below and/or above the first seismic mass. In each case one of the electrodes is very particularly preferably arranged on one side of the torsion axis with respect to the x-y plane, and the other electrode is arranged on the other side. As a result, opposing changes in capacitance can be detected, as a result of which the absolute capacitance, which possibly changes over time, does not have to be taken into account. It is therefore possible to carry out differential signal processing.

It is expedient that at least one of the electrodes is arranged in the z direction above the seismic mass, and at least one other of the electrodes is arranged in the z direction below the seismic mass. This design permits both differential detection of the deflection of the seismic mass and the construction of the acceleration sensor or of electrodes of the acceleration sensor on a relatively small area, in particular with respect to the x-y plane.

The acceleration sensor expediently has at least one comb structure as a reading device/devices which is/are assigned to the first frame and connected thereto.

The acceleration sensor preferably comprises at least one pair of seismic masses which have a deflection direction or orientation which is opposed relative to one another or alternatively uniform deflection direction or orientation. In this context, these deflections are, in particular, rotational or torsional deflections.

It is expedient that the at least first seismic mass and a second seismic mass are each suspended on the first frame or an additional frame.

The acceleration sensor preferably comprises a first frame which is suspended on the substrate in such a way that it can be deflected, in particular essentially exclusively, in the x direction, wherein the acceleration sensor additionally has a second frame which is arranged in the internal region of the first frame and is suspended thereon in such a way that it can be deflected, in particular essentially exclusively, in the y direction, and wherein at least one seismic mass which is suspended on the second frame by means of at least one torsion spring and can be deflected rotationally, in particular essentially exclusively, in the z direction, is arranged in the internal region of the second frame. As a result of this design, the acceleration sensor is sensitive in two directions in relation to relatively large accelerations, and in at least one direction in relation to relatively small accelerations. This design is suitable in particular as an integrated, combined ESP airbag acceleration sensor. The acceleration sensor particularly preferably has four seismic masses which are each suspended on the second frame, wherein the second frame comprises an external frame segment and an internal frame segment, which are in particular integrally connected to one another, and in each case two seismic masses are suspended with a torsion axis essentially parallel to the x axis and in each case two seismic masses are suspended with a torsion axis essentially parallel to the y axis.

It is preferred that at least the first seismic mass has, at least on its surface lying opposite the electrodes, trenches which are each formed in particular essentially parallel to one another. A defined geometric design of these trenches allows defined damping of the deflection of the seismic mass to be set, particularly preferably by means of the number and width of these trenches.

At least one spring element on which a seismic mass or a frame is suspended, and/or at least one torsion spring on which a seismic mass or a frame is suspended, expediently has/have at least one piezo-sensitive element. The at least one piezosensitive element is in particular a piezoresistive element or a piezoelectric element. A piezoresistive element particularly preferably comprises in this context at least one resistance bridge which is particularly preferably applied to one or more spring elements or torsion springs. By means of a piezosensitive element it is possible to detect the deflection of a seismic mass or of a frame without an additional reading device, in the form of a comb structure or an electrode, or such a piezosensitive element can replace a reading device in the form of a capacitive structure, as a result of which the area or chip area of the acceleration sensor can be kept relatively small, in particular with respect to the x-y plane.

The piezosensitive elements which are embodied as piezoresistive elements are expediently manufactured by means of lithography methods and locally limited doping of the silicon surface. The typical resistance values are in the single-digit kΩ range.

In contrast, piezosensitive elements which are embodied as piezoelectric elements are preferably implemented by means of thin-layer depositions on the surface and subsequently patterned by means of lithography methods and subsequently by means of wet etching or dry etching methods. Such thin films may, for example, be aluminum nitride or in particular lead-zirconium titanate (PZT) and are particularly preferably deposited with a thickness between submicrometers to several tens of micrometers.

The acceleration sensor preferably comprises two proposed acceleration component sensors which have, in particular, a common substrate, wherein these two acceleration component sensors are arranged essentially orthogonally to one another and together form an integrated acceleration sensor.

The acceleration sensor is expediently embodied as a monolithic sensor.

It is preferred that the acceleration sensor be embodied as a micro-electrical mechanical system (MEMS) or MEMS module which has, in particular, mechanical and electronic means for connecting to and/or interacting with further MEMS modules and/or with at least one electronic signal processing circuit.

It is expedient that the torsion axis along the at least one torsion spring on which the at least first seismic masses is suspended are not located in the planes which are defined by the respective mass center of gravity in the respectively non-deflected state of the seismic mass, and the x axis as the normal of the plane.

The acceleration sensor is preferably permanently or rigidly connected to the system or inertial system on which the one or more accelerations which are to be detected act. The system here is particularly preferably a motor vehicle chassis.

The acceleration sensor according to aspects of the invention is provided for use in automation technology, in motor vehicles and in aircraft, in particular in the respective corresponding control systems. The acceleration sensor according to aspects of the invention is particularly preferably provided for use in a motor vehicle control system which comprises at least parts of a brake system, very particularly preferably at least as a combined, integrated airbag ESP acceleration sensor.

BRIEF DESCRIPTION OF THE DRAWINGS

The invention is best understood from the following detailed description when read in connection with the accompanying drawings. Included in the drawings are the following schematic figures.

DETAILED DESCRIPTION OF THE PREFERRED EMBODIMENTS

Figure 1:
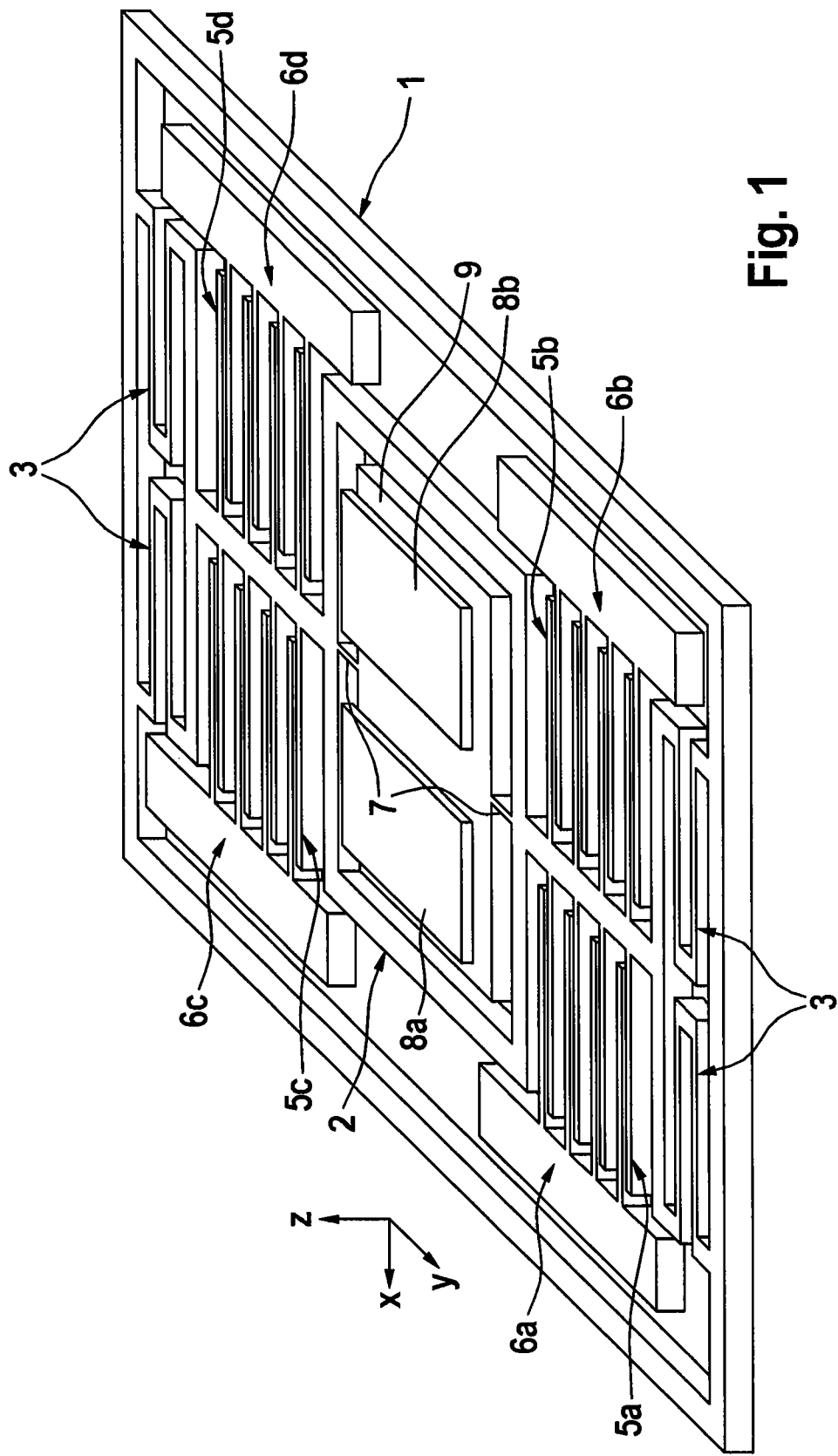
FIGS. 1, 2 show an exemplary embodiment of an acceleration sensor with merely a first seismic mass.
Figure 2:
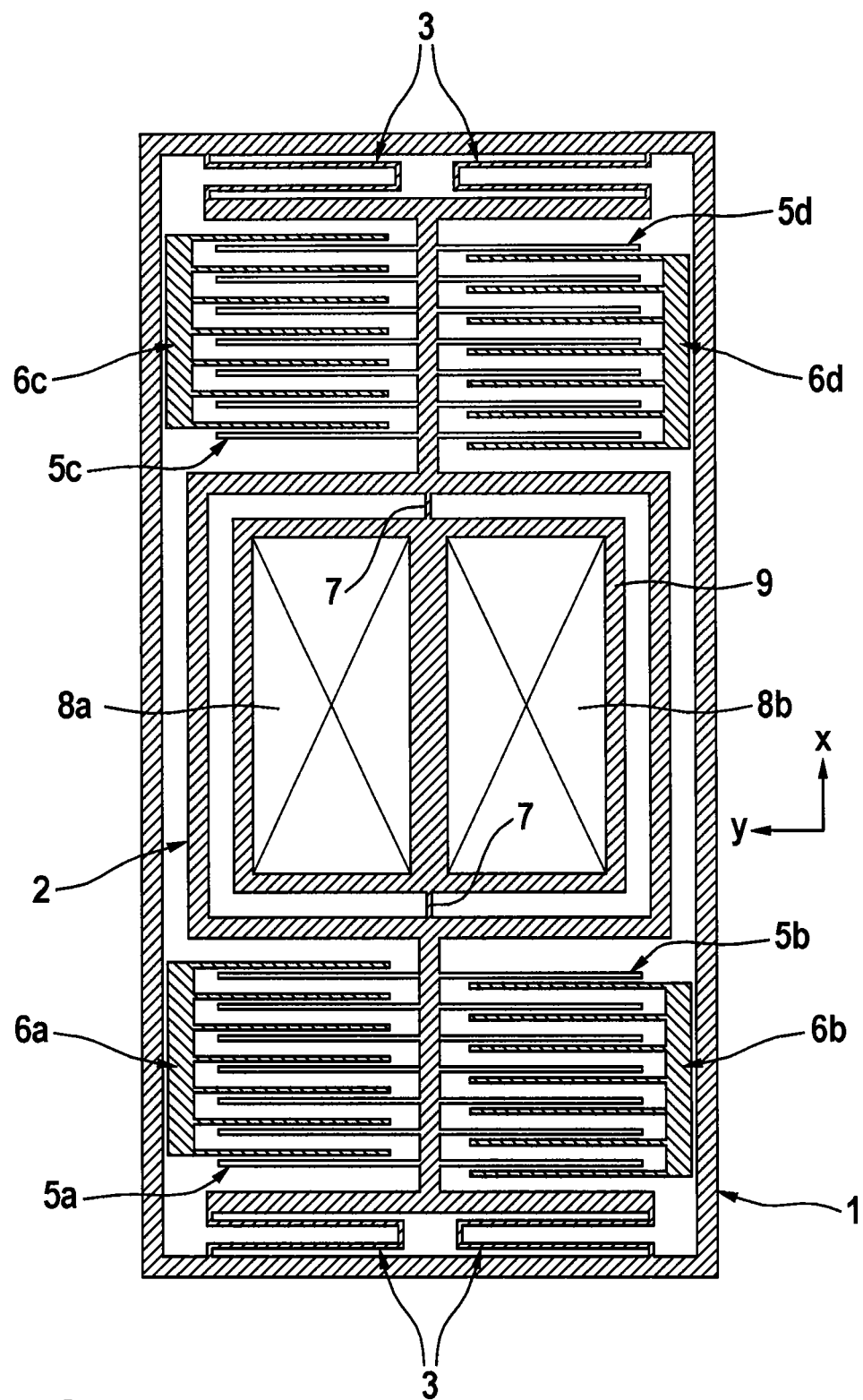

An exemplary embodiment of an acceleration sensor is illustrated in a spatial illustration in FIG. 1, and in plan view in FIG. 2. This acceleration sensor comprises a substrate which is embodied as a frame 1. The substrate frame 1 is oriented here, as depicted, with respect to the Cartesian x-y-z coordinate system. Furthermore, the substrate or frame 1 is firmly and rigidly directly or indirectly connected to, for example, the inertial system on which the accelerations which are to be detected primarily act. In the substrate frame 1a first deflectable frame 2 is suspended thereon by means of spring elements 3. The spring elements 3 permit a movement of the frame 2 or of the first deflectable frame in the direction of a measuring direction parallel to the y axis, but they are rigidly embodied in the spatial directions x and z. The measuring direction parallel to the y axis corresponds to the direction for the detection of relatively large accelerations (high-G). Parallel the x direction, the acceleration sensor additionally has a measuring direction for detecting relatively small accelerations (low-G). Comb structures 5a, 5b, 5c and 5d are attached to the frame 2. Further comb structures 6a, 6b, 6c and 6d are secured with respect to a housing (not illustrated) and therefore with respect to the inertial system and are electrically insulated from the frame 2. Each comb structure 6 which is secured with respect to the inertial system forms a capacitor with the movable comb structure 5. In the course of a relative movement between the frame 2 and the substrate frame 1, the capacitances of the capacitors 5a/6a and 5d/6d change in the same way, and the capacitors 5b/6b and 5c/6c behave likewise. In contrast, the capacitances of the capacitors 5a/6a and 5d/6d change inversely with respect to the capacitances of 5b/6b and 5c/6c here. As a result, the capacitors can be evaluated differentially. If an acceleration acts on the sensor in the y direction, the frame 2 is deflected with respect to the substrate frame 1 in the y direction with inverse orientation (−y), and changes in capacitance occur in the comb structures or capacitors 5a/6a, 5d/6d, 5b/6b and 5c/6c, corresponding to the capacitor plate arrangements 5 to 6.

In the case of an acting acceleration in the x direction, spring elements 3 block a movement of the frame 2. As a result, the detection capacitors 5 and 6 remain at rest, or do not have any changes in capacitance, and no signal is generated in the high G element. Furthermore, a seismic mass 9 is suspended on the frame 2 via a torsion spring 7, with the torsion axis being embodied parallel to the y axis. The seismic mass 9 has a mass center of gravity 10 which is moved out with respect to the torsion spring 7. If an acceleration acts in the x direction, the seismic mass 9 is deflected rotationally about the torsion axis of the torsion spring 7. As a result, the gap distance between the seismic mass 9 and the electrodes 8a and 8b changes. Depending on the orientation with which the acceleration acts, the capacitance value, measured between the seismic mass 9 and the electrode 8a, therefore becomes greater or smaller, and between the seismic mass 9 and the electrode 8b it becomes smaller or larger, in the opposite direction to 8a. As a result, the basic capacitance can in turn be eliminated by forming differences, and only the sums of the differences in capacitance can be measured.

Figure 3:
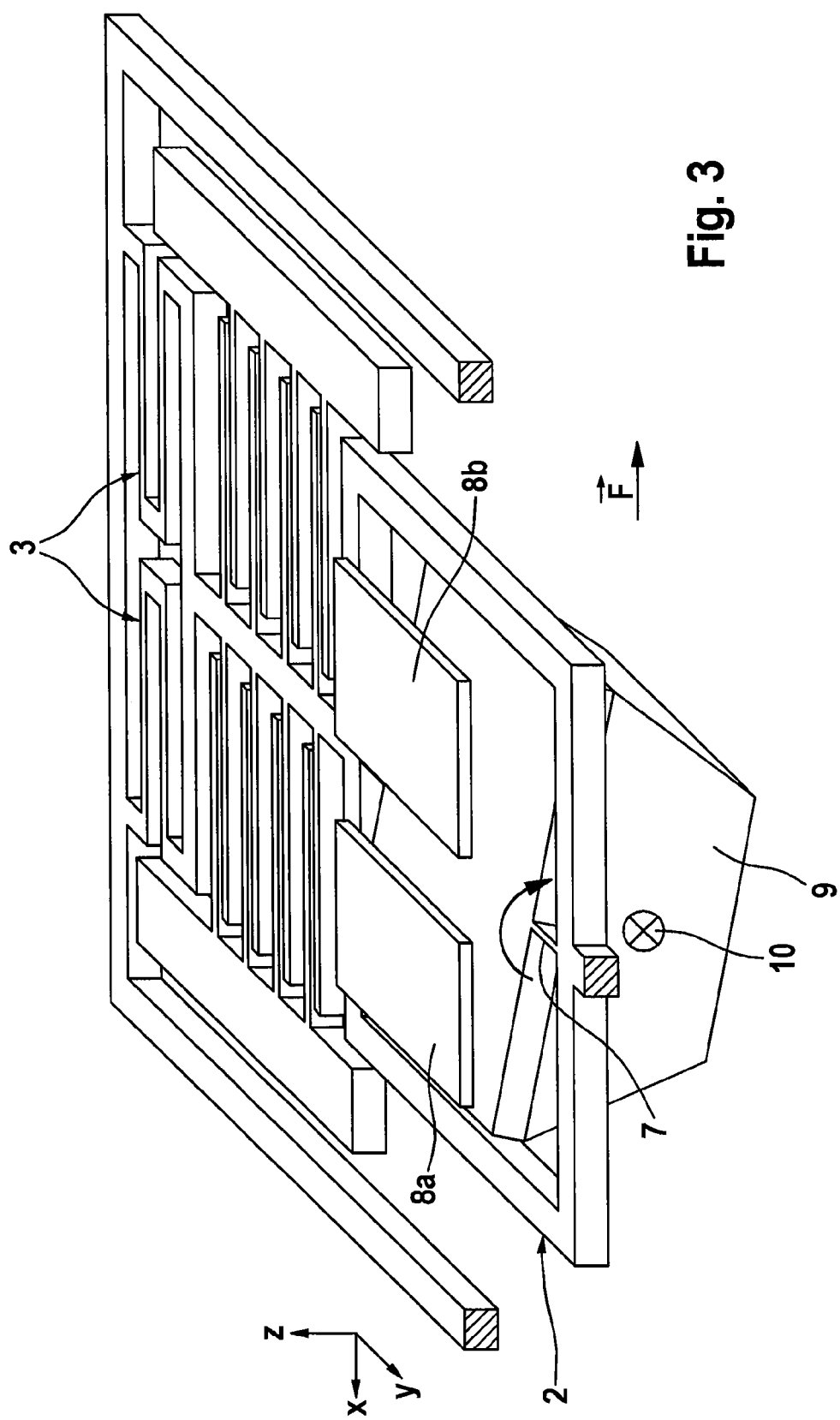
FIG. 3 shows the exemplary acceleration sensor from FIGS. 1 and 2 in section.

FIG. 3 illustrates the exemplary acceleration sensor, explained with respect to FIGS. 1 and 2, in a cut-open spatial illustration. The seismic mass 9 has a mass center of gravity 10 which is moved out with respect to the torsion spring 7, as illustrated in FIG. 2 as a supplement to FIG. 1. This mass center of gravity 10 is located here in the plane which is spanned by the torsion axis of the torsion spring 7 and the z axis, which forms a normal to the surface of the structure.

When a force $\vec{F}$ acts owing to an acceleration in the x direction, the seismic mass 9 is deflected rotationally, and this deflection is detected differentially by electrodes 8a and 8b.

Figure 4:
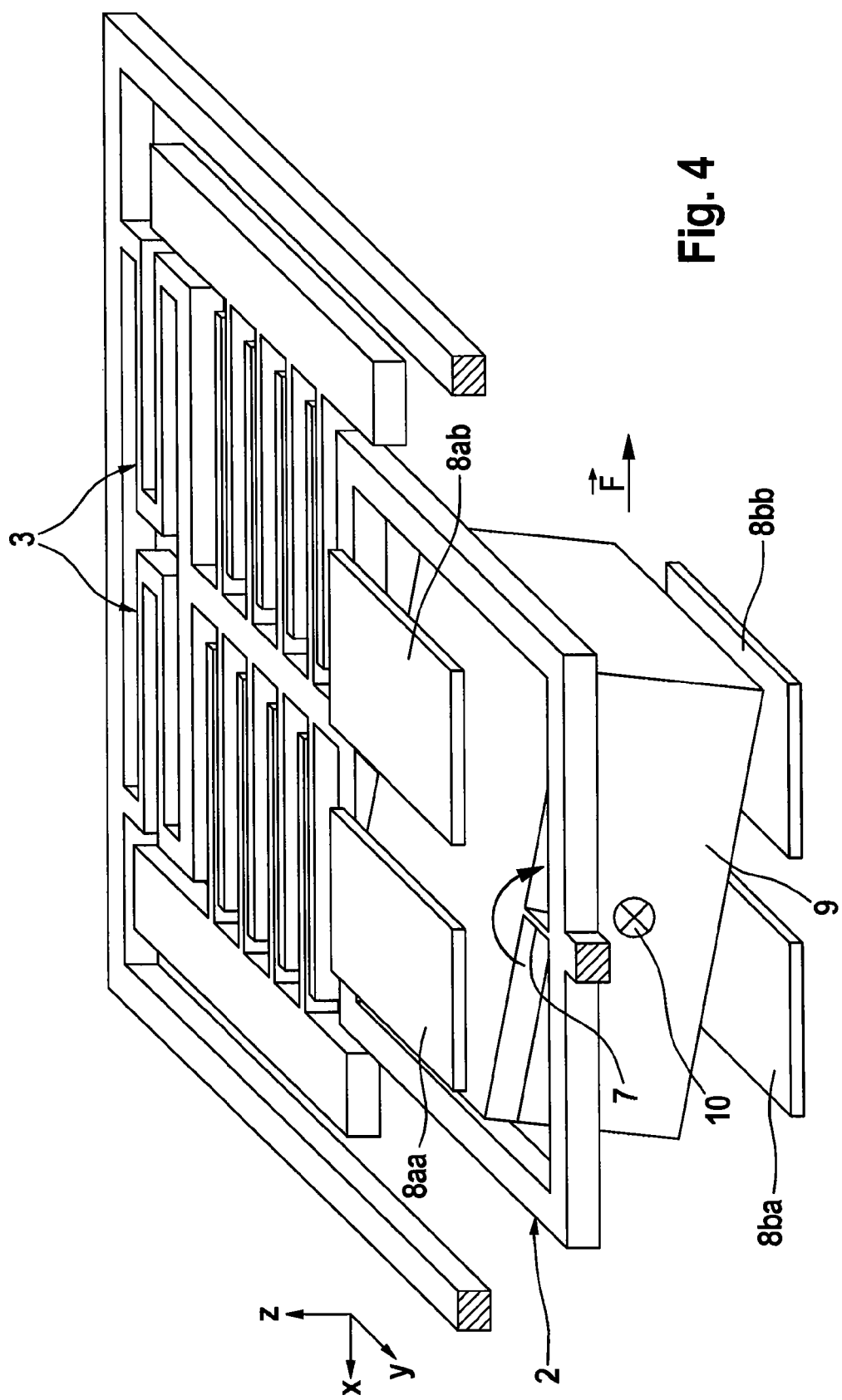
FIG. 4 shows an exemplary embodiment with a seismic mass to which two electrodes are respectively assigned above and below in the z direction.

FIG. 4 shows an exemplary acceleration sensor which differs from the acceleration sensor illustrated in FIGS. 1 to 3 by having two additional electrodes 8ba, 8bb which are arranged underneath the seismic mass 9 in the z direction. The seismic mass 9 also has here a mass center of gravity 10 which is moved out with respect to its torsion suspension 7 on the frame 2. The electrodes 8aa, 8ab, 8ba and 8bb detect differentially the rotational deflection of the seismic mass 9 due to an acting acceleration in the x direction. As a result of the detection of the deflection of the seismic mass 9 by means of electrodes 8aa, 8ab, 8ba and 8bb, a larger signal amplitude of the x direction acceleration signal is generated than in the case of detection with two electrodes. This is utilized, for example, to construct the acceleration sensor, in particular the part which is suspended on the frame 2 and is sensitive in the x direction, with relatively small dimensions and nevertheless obtain a sufficiently large signal amplitude of the x direction acceleration signal. The electrodes 8*a*, 8*ab* and 8*ba* and 8*bb* are each arranged to the right and left, with respect to the x direction, of the torsion axis of the seismic mass 9 which is predefined by the torsion spring 7.

Figure 5:
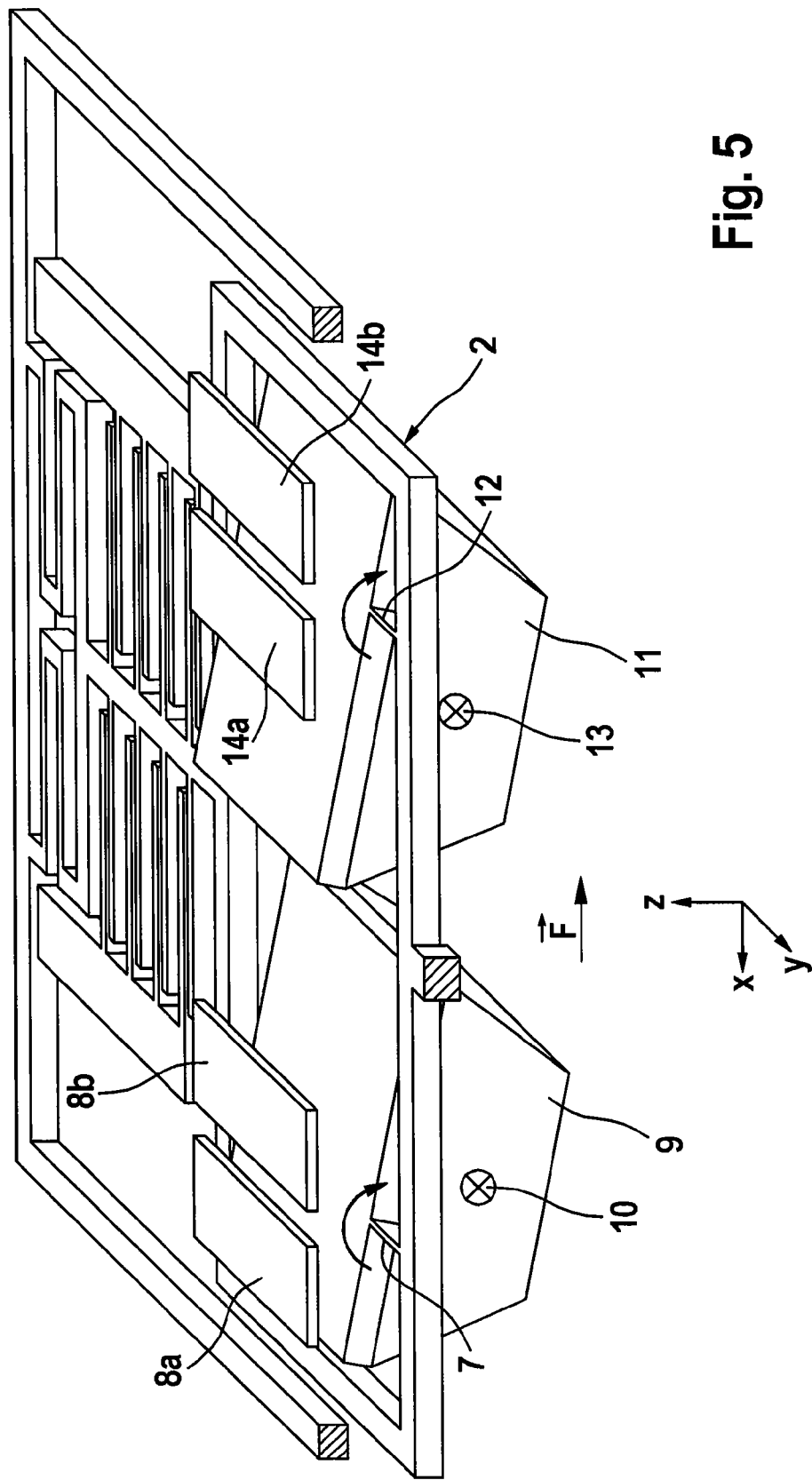
FIGS. 5, 6 show an exemplary embodiment with two seismic masses and exemplary deflections of these seismic masses owing to acting accelerations.
Figure 6:
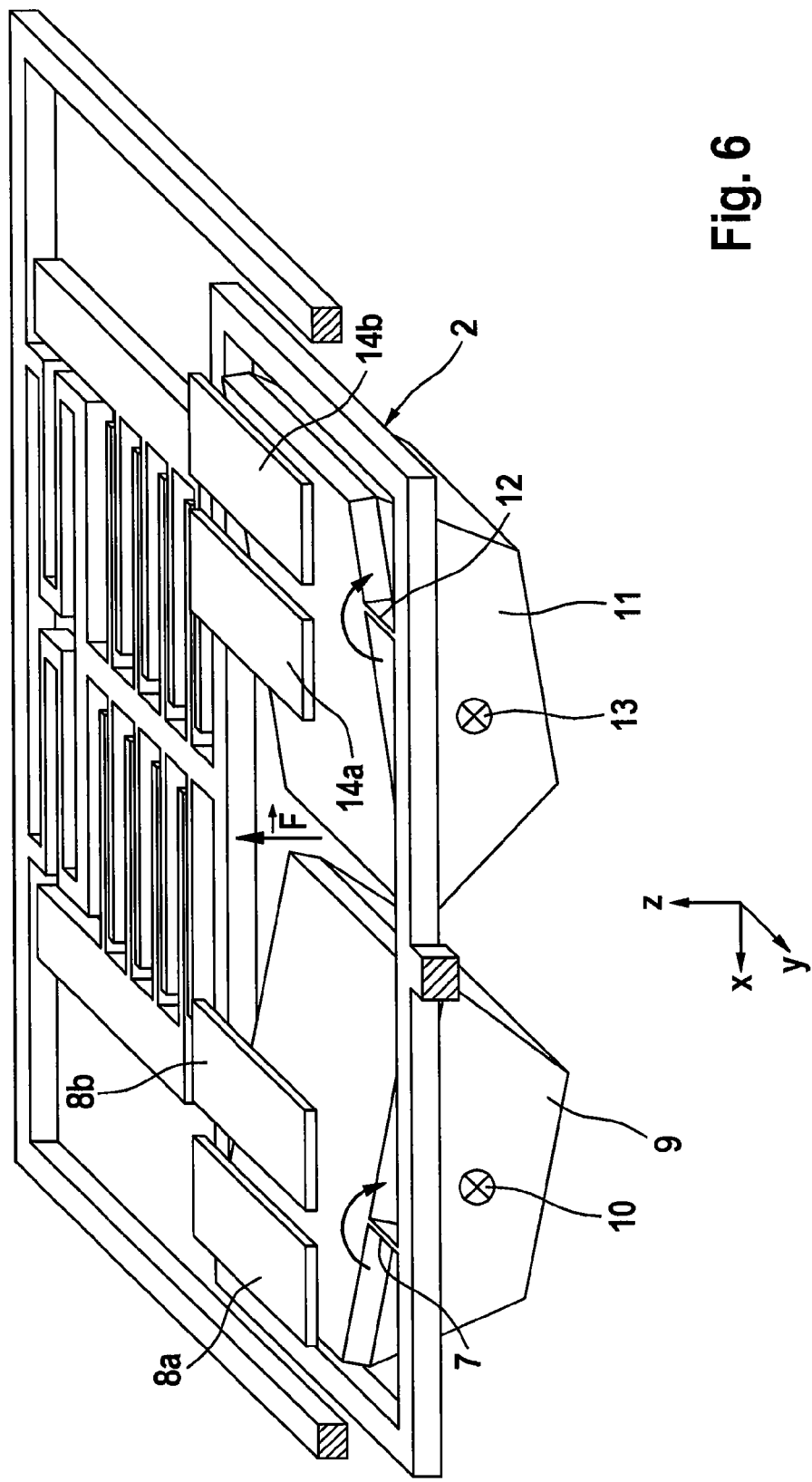

FIGS. 5 and 6 shows the design of an alternative, exemplary acceleration sensor with two seismic masses 9 and 11. The torsion axes along the torsion springs 7 and 12 on which seismic masses 9 and 11 are suspended on the frame 2 are here not located in the planes which are defined by the respective mass center of gravity 10, 13 in the respectively non-deflected state of seismic masses 9, 11, and the x axis as the normal of the plane. The two seismic masses 9 and 11 are embodied and suspended mirror-symmetrically with respect to a y-z plane through the center point of the sensor. If an acceleration acts in the x direction, the torsion springs 7 and 12 twist with the same orientation, and the capacitances 9/8*a* and 11/14*a*, or 9/8*b* and 11/14*b* respectively, change in the same direction, as illustrated in FIG. 5. If an acceleration acts in the z direction, the torsion springs 7 and 12 are twisted with opposing orientation or deflected rotationally, as is shown in FIG. 6, and the capacitances 9/8*a* and 11/14*a*, or 9/8*b* and 11/14*b* respectively, change in opposite directions or inversely. The acceleration direction can be determined by means of these different types of deflection. The sensitivity can be set by the distance between the torsion axes and the planes in which the mass centers of gravity 10 and 13 are located and which have a surface normal in the x direction. The electrodes 8*a*, 8*b* and 14*a*, 14*b* are adapted in terms of their area and position to the torsion axes of the seismic masses 9, 11 in such a way that the opposing change in capacitance is identical both for 9/8*a* and 9/8*b*, or 9/14*a* and 9/14*b*, respectively.

Figure 7:
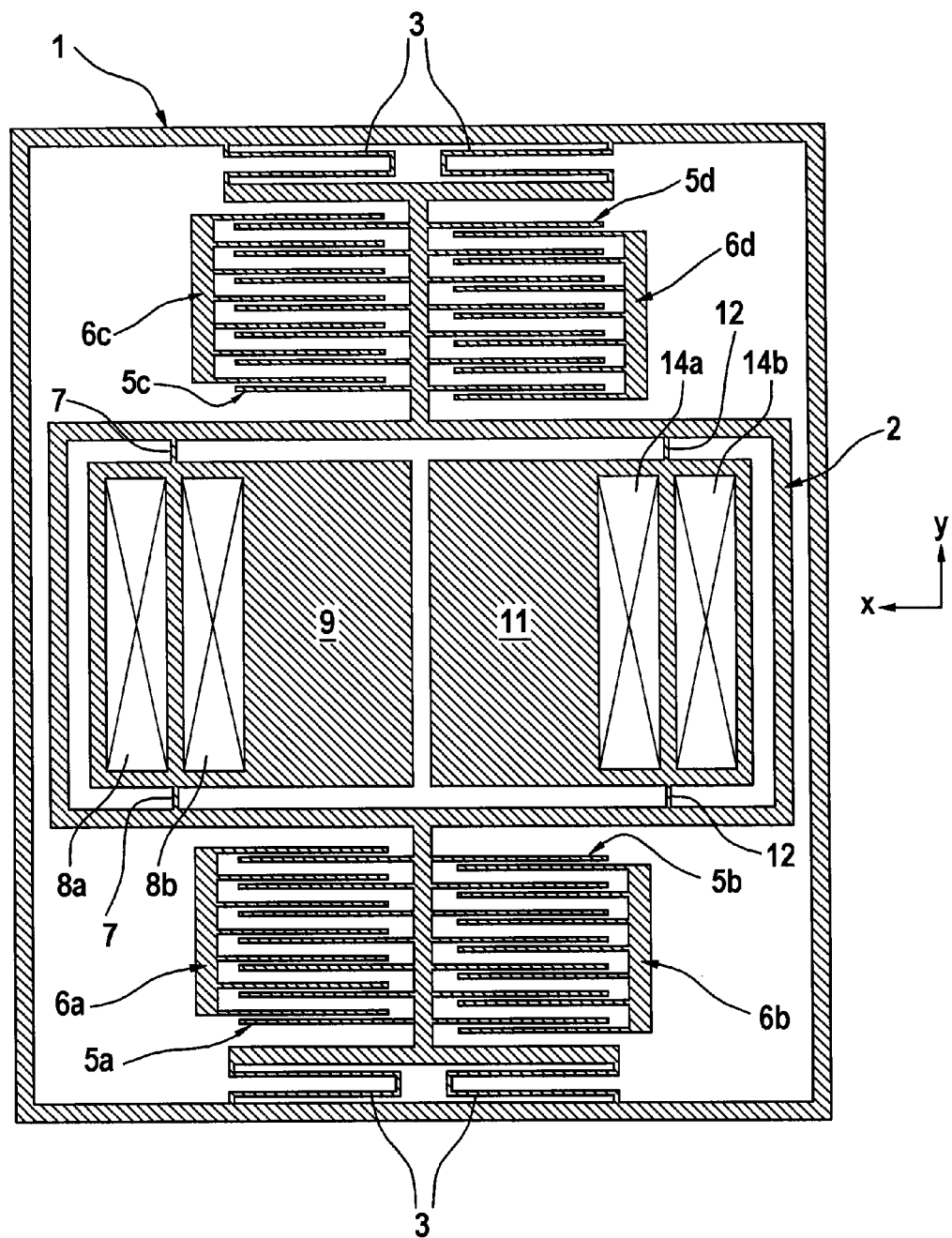
FIG. 7 shows the exemplary embodiment from FIGS. 5 and 6 in a plan view.

FIG. 7 shows the exemplary embodiment from FIGS. 5 and 6 in a plan view.

Figure 8:
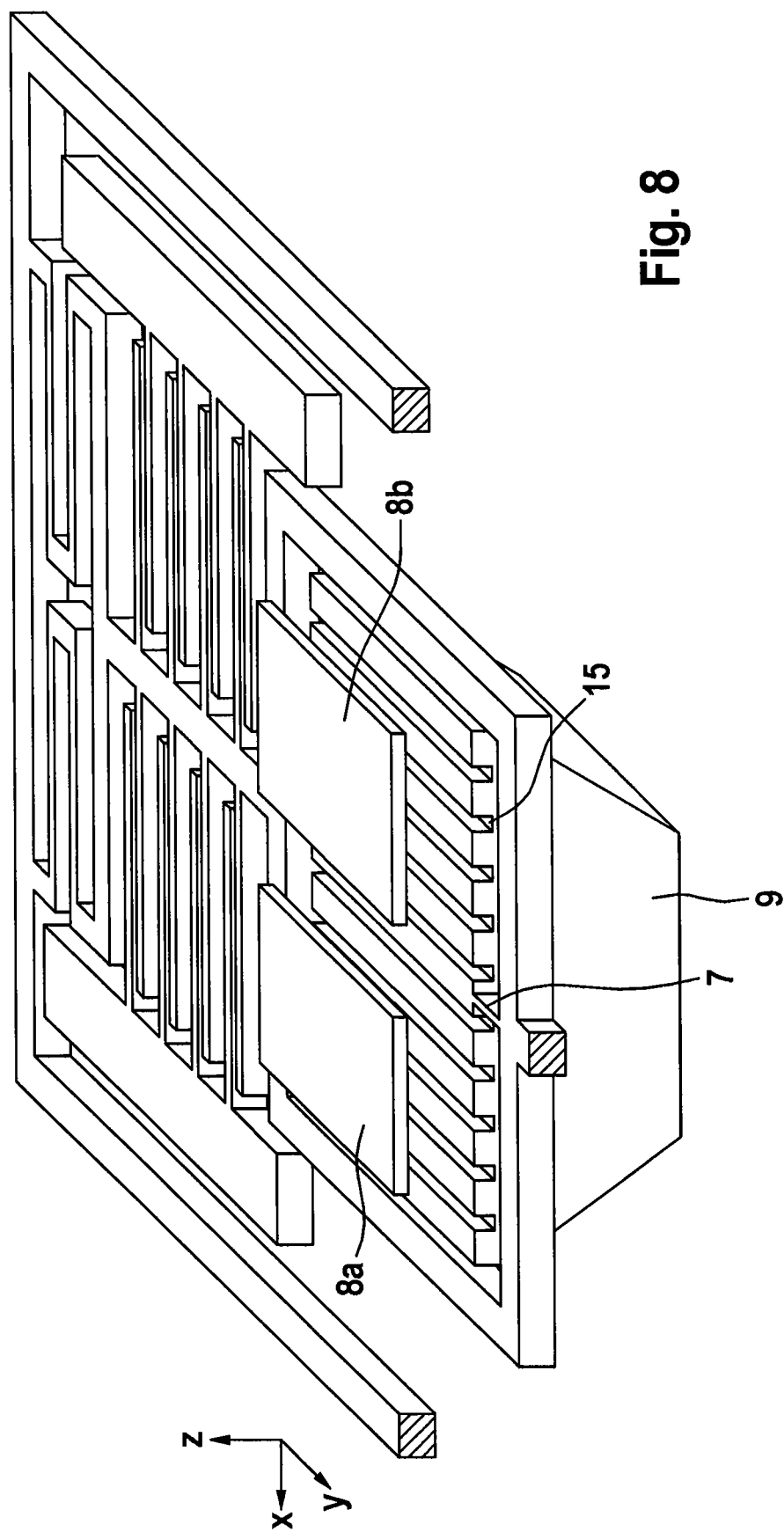
FIGS. 8, 9 show the exemplary embodiment of a seismic mass with defined trenches on its upper side, opposite the reading electrodes.
Figure 9:
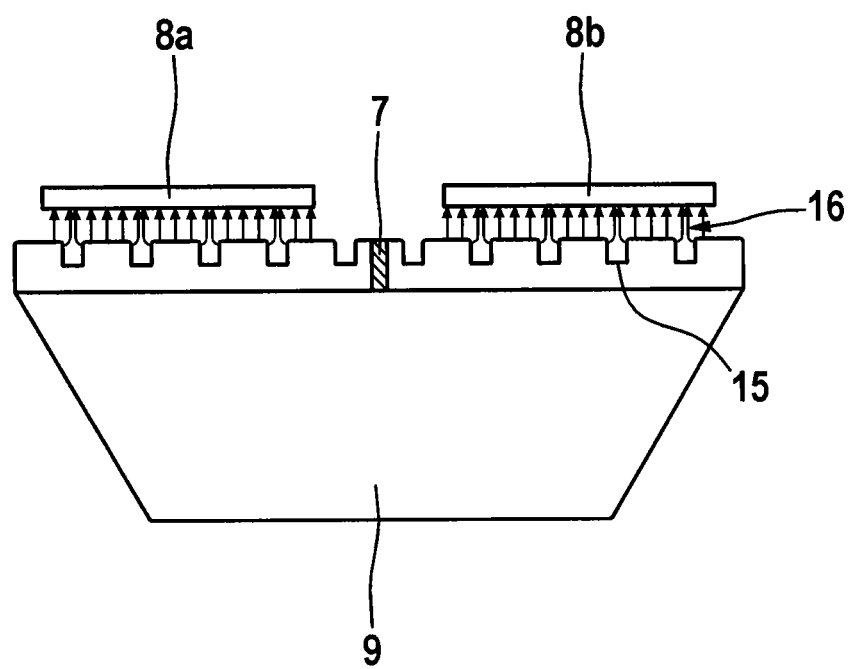

An exemplary embodiment of first seismic mass 9 for setting defined damping with respect to the deflection of the first seismic mass 9 when a relatively small acceleration is detected will be explained with reference to FIGS. 8 and 9. As a result of the patterning of the surface of the structure with trenches 15 or ducts, which run, for example, parallel or alternatively perpendicular (not illustrated) to the torsion axis 7, the gas which is located between the electrodes 8*a* and 8*b* and the surface of the structure of the seismic mass 9 can more easily escape. As a result, the damping of the deflection of the first seismic mass 9 in the z direction is eliminated. Given a favorable setting of the gap width between the electrode 8*a*, 8*b* and the seismic mass 9, the capacitance changes less than the surface of the capacitance plate, i.e. the component surface of the upper side of the seismic mass 9 lying opposite the electrode 8. This is caused by parasitic fields 16 on the edges of the trenches 15.

Figure 10:
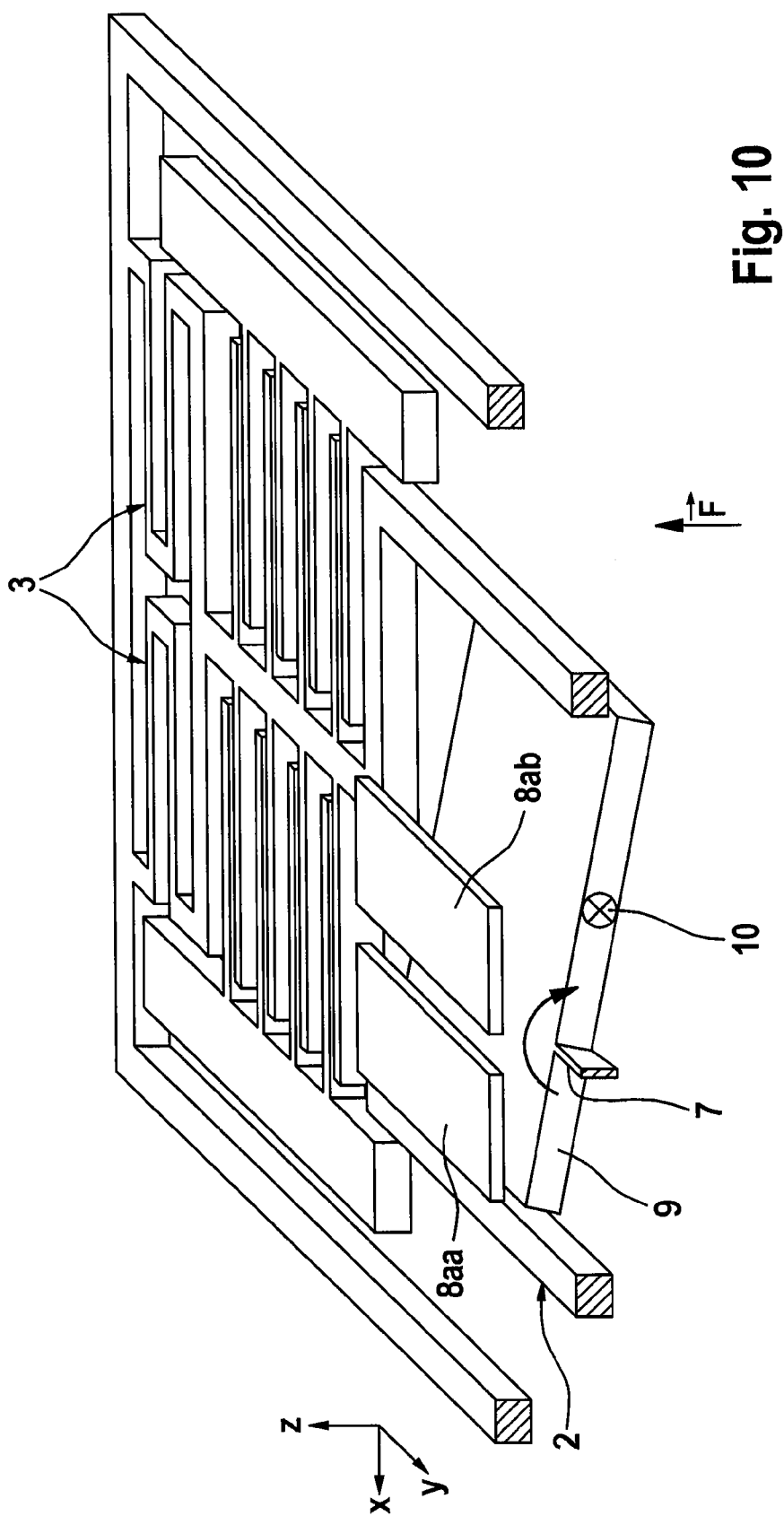
FIG. 10 shows a seismic mass with a mass which is not moved out, for example, with respect to the x-y plane in the non-deflected state.

FIG. 10 illustrates an exemplary embodiment of an acceleration sensor partially or in a cut-away fashion, the seismic mass 9 of which is embodied in the form of a plate or flat in the z direction and has a mass center of gravity 10 which does not lie on the torsion axis of the torsion spring 7 on which the seismic mass 9 is suspended on the frame 2. However, in this context, in the non-deflected state of the seismic mass 9 the mass center of gravity 10 lies essentially in a plane parallel to the x-y plane through which the torsion axis of the torsion spring 7 runs. The electrodes 8*aa* and 8*ab* are adapted in terms of their area and position to the torsion axis in such a way that the opposing change in capacitance is identical both for 9/8*aa* and 9/8*ab*. As a result of this arrangement, the component sensor element which is formed by the seismic mass 9 suspended on the frame 2 is configured for detecting relatively small accelerations sensitively in the z direction.

Figure 11:
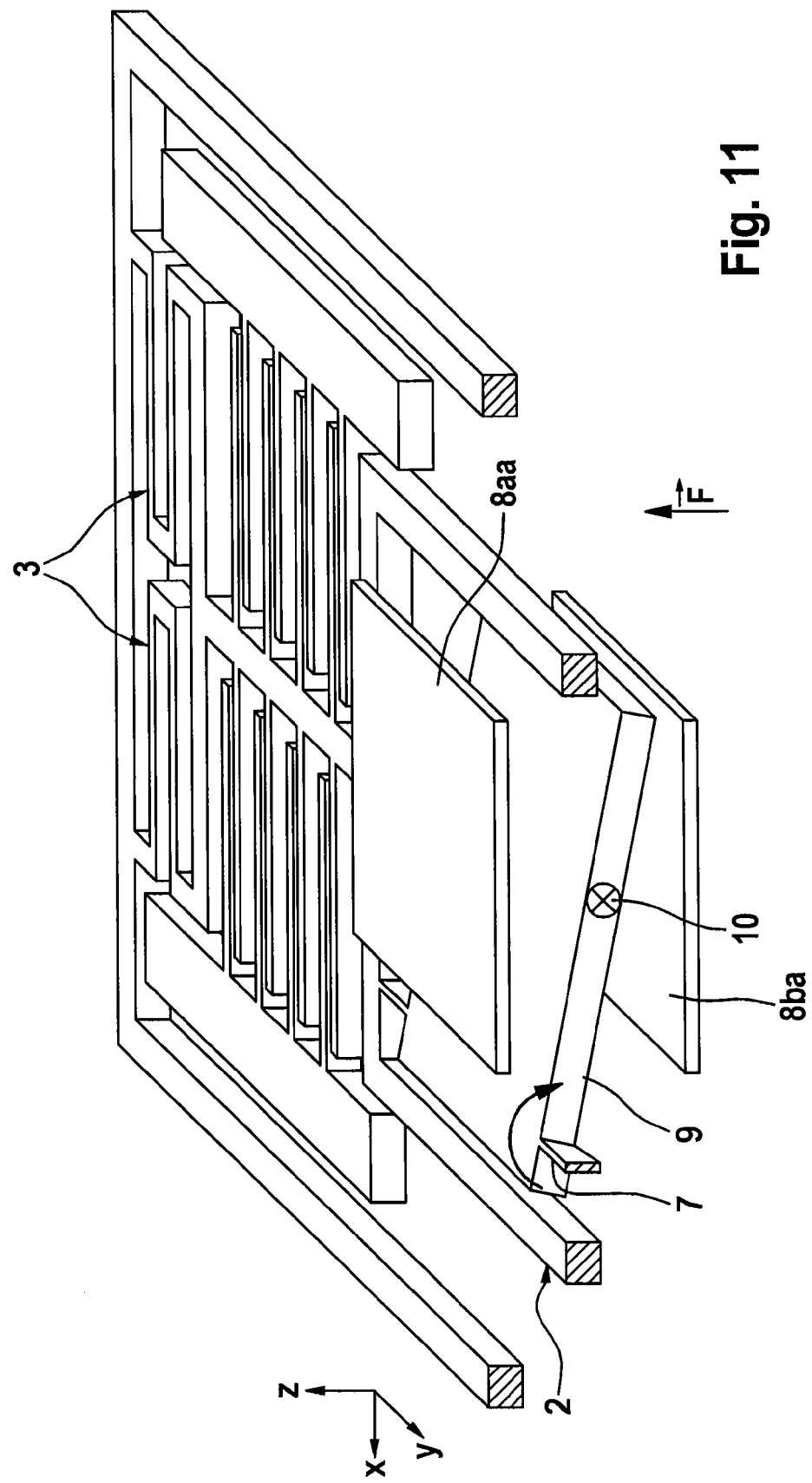
FIG. 11 shows an exemplary embodiment in which an electrode is respectively assigned, above and below, to a seismic mass of flat design which is suspended eccentrically with respect to its center of gravity.

FIG. 11 shows an exemplary embodiment which is an alternative to the acceleration sensor illustrated in FIG. 10 and in which an electrode 8*aa* and 8*ba* is arranged in the z direction, respectively above and below a seismic mass 9 which is of flat design. These electrodes 8*aa*, 8*ba* are each arranged here in the x direction on one side, for example illustrated on the right, of the torsion axis of the seismic mass 9 which is defined by the torsion spring 7.

Figure 12:
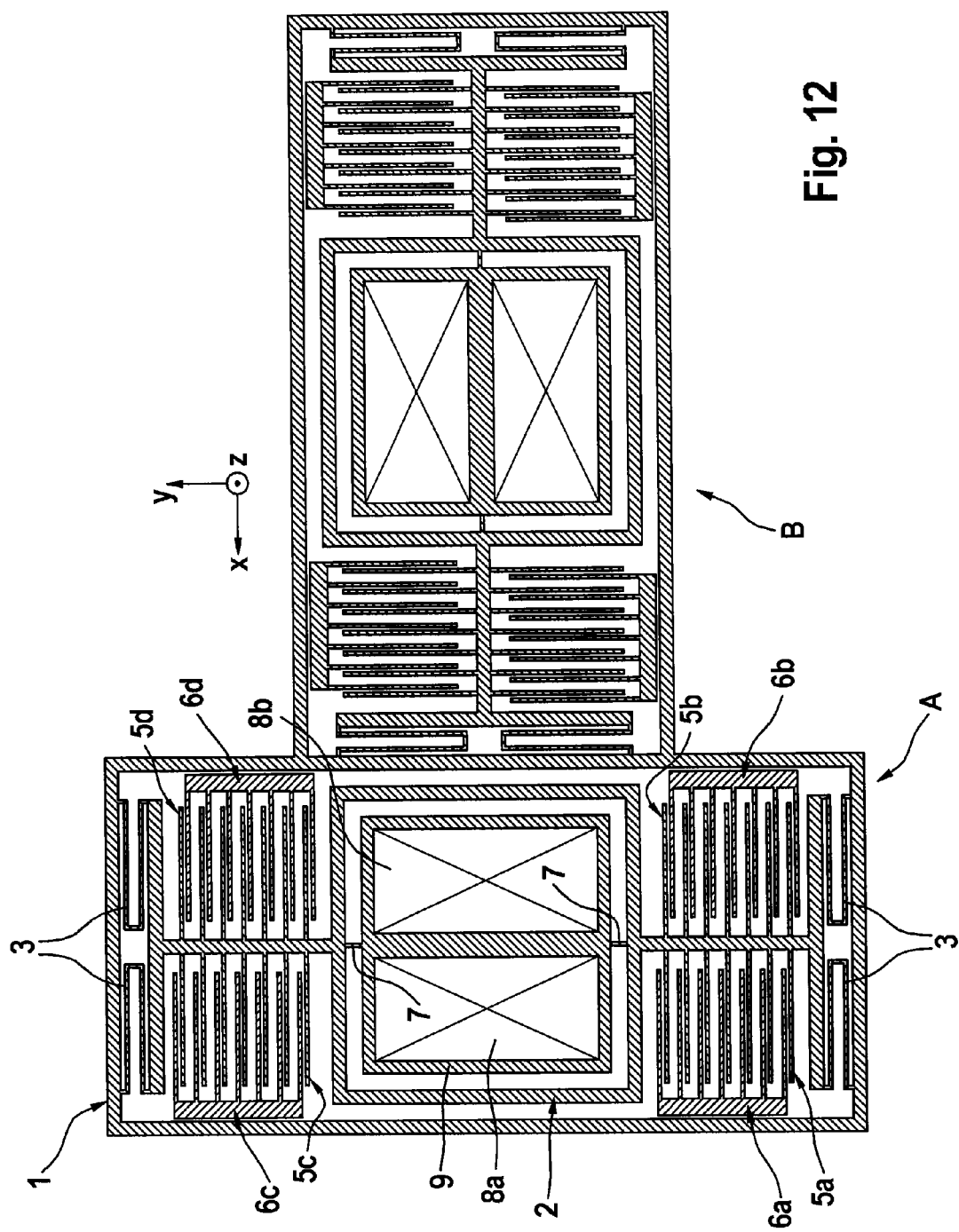
FIGS. 12, 13 show exemplary acceleration sensors, each comprising two integrated acceleration component sensors.

FIG. 12 illustrates an exemplary embodiment of an integrated acceleration sensor which is composed of two acceleration component sensors A, B which are arranged orthogonally to one another in the x-y plane and are of, for example, identical design. This acceleration sensor is embodied on a common chip and has in each case a measuring direction parallel to the x and y axes, both for accelerations which are relatively large in absolute value and accelerations which are relatively small in absolute value. As a result, the sensitivity directions in the x and y directions are oriented both for low G and high G measurements. In the acceleration component sensor A, the seismic mass 9 is suspended from the frame 2 by means of a torsion spring 7, wherein the torsion axis is embodied parallel to the y axis. The seismic mass 9 has a mass center of gravity which is moved out with respect to the torsion spring 7. If a preferably relatively low acceleration (low G) acts in the x direction, the seismic mass 9 is deflected rotationally about the torsion axis of the torsion spring 7. As a result, the gap distance between the seismic mass 9 and the electrodes 8*a* and 8*b* changes. Depending on the orientation with which the acceleration acts, the capacitance value, measured between the seismic mass 9 and the electrode 8*a*, therefore becomes larger or smaller, or becomes smaller or larger between the seismic mass 9 and the electrode 8*b*, in the opposite direction to 8*a*. The frame 2 is suspended on the substrate 1 in such a way that it can be deflected in the y direction by means of springs 3. The comb structures 5*a-d* and 6*a-d* detect here as reading directions the deflection of the frame in the y direction and therefore preferably relatively large accelerations (high G). As a result, the sensitivity directions in the y direction and in the x direction are oriented for high G measurement, and for the low G measurement in the x direction and the y direction.

Alternatively, it is also possible to combine acceleration sensors, such as are described on the basis of one of the previous FIGS. 1 to 11 and FIGS. 15 to 17, and to arrange them orthogonally to one another on a chip.

Figure 13:
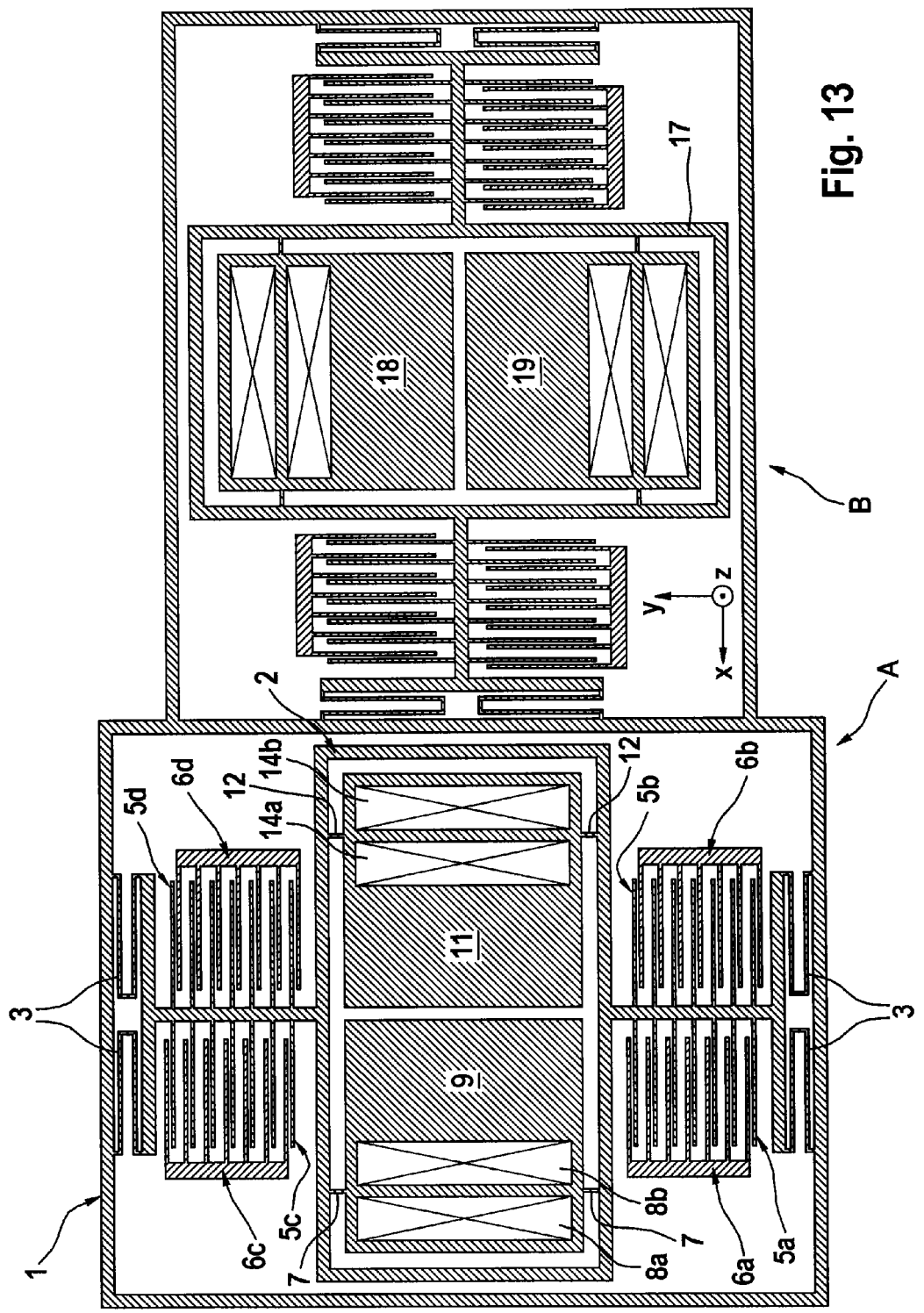

FIG. 13 shows an exemplary embodiment in which the sensor which is depicted in FIG. 12 is supplemented by a second seismic mass 11 which each acceleration component sensor A and B comprises. The acceleration component sensors A and B are, for example, of identical design here, arranged on a common chip and form an exemplary, integrated acceleration sensor. The acceleration component sensors are each formed in accordance with the acceleration sensor which is described on the basis of FIGS. 5, 6 and 7. The exemplary sensor is correspondingly embodied in such a way that it can detect relatively large accelerations (high G) in absolute value in the x and y directions by detecting the deflections of the frames 2 and 17, and can detect relatively small accelerations (low G) in absolute value in the x, y and z directions by detecting the deflections of the seismic masses 9, 11 and 18, 19. Four acceleration information items are therefore acquired for three acceleration directions, as a result of which the plausibility of the signals and information items can be assessed.

Figure 14:
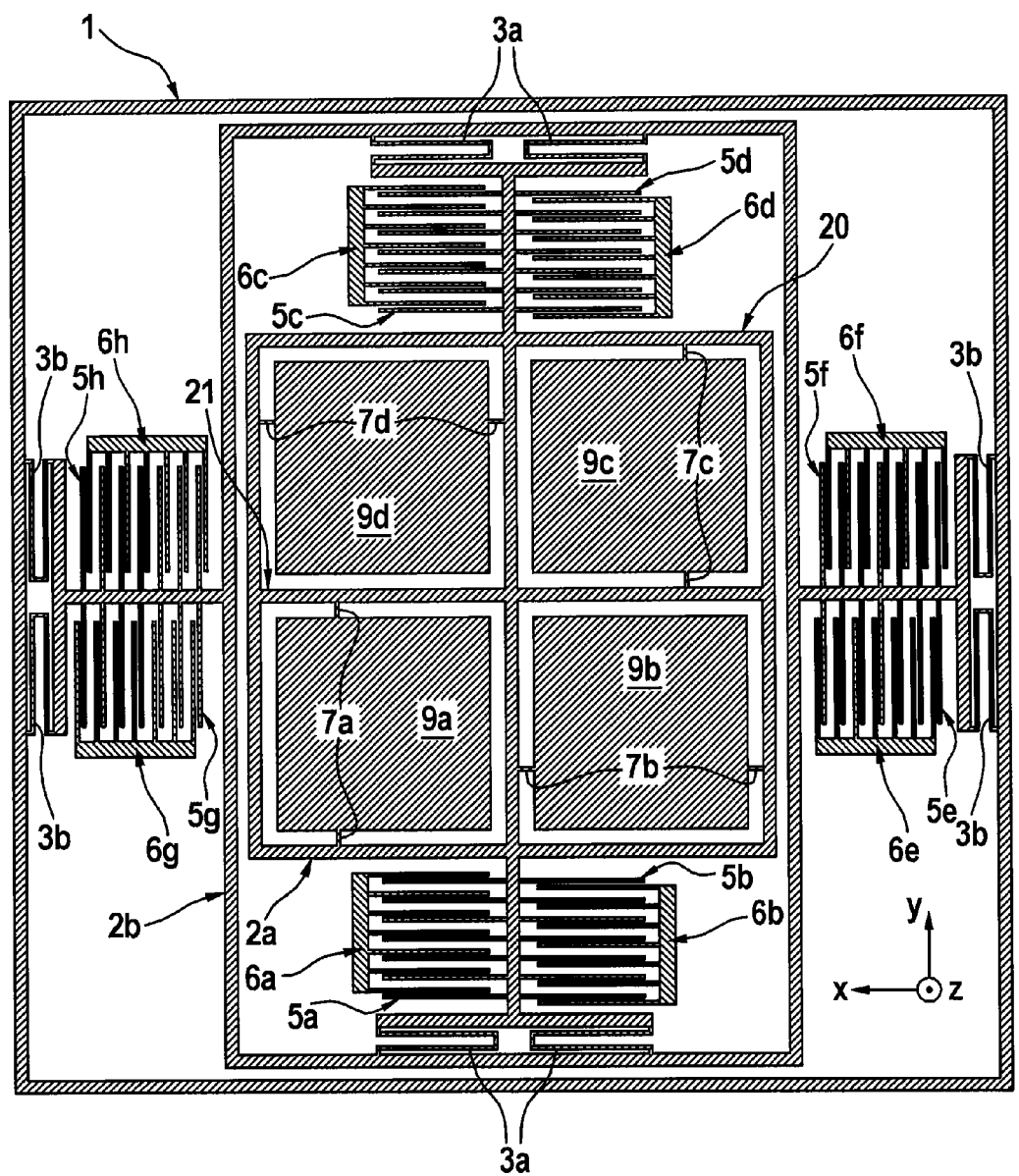
FIG. 14 shows an exemplary embodiment of an acceleration sensor with two frames which are suspended in a deflectable fashion and four seismic masses.

In order to reduce the area required, in the acceleration sensor illustrated in FIG. 14 the four seismic masses 9a, 9b, 9c and 9d are suspended on a common frame 2a. The latter comprises here an external frame segment 20 and an internal frame segment 21, which are integrally connected to one another. Furthermore, the exemplary acceleration sensor has an additional frame 2b, as a first frame, which is suspended in such a way that it can be deflected in the x direction on the substrate frame 1 by means of the spring elements 3b. The frame 2a is in turn suspended on the frame 2b in such a way that it can be deflected in the y direction by means of the spring elements 3a. As a result of the deflection of the two frames it is possible to detect relatively large accelerations in the x and z directions. The substrate frame 1 is, for example, firmly and rigidly indirectly connected to the chassis of a motor vehicle as an inertial system whose accelerations are to be detected. Reading and detection devices 5a-d and 6a-d serve to measure the high G acceleration in the y direction, and the reading and detection devices 5e-h and 6e-h serve to measure the high G acceleration in the x direction. The seismic masses 9a and 9c twist about the torsion springs 7a, 7c in the case of accelerations in the y direction, and the seismic masses 9b, 9d twist about the torsion springs 7b, 7d in the case of accelerations in the x direction. In the case of accelerations in the z direction, all the seismic masses 9a-9d twist together about the torsion springs 7a-7d in the z direction with the same orientation.

Figure 15:
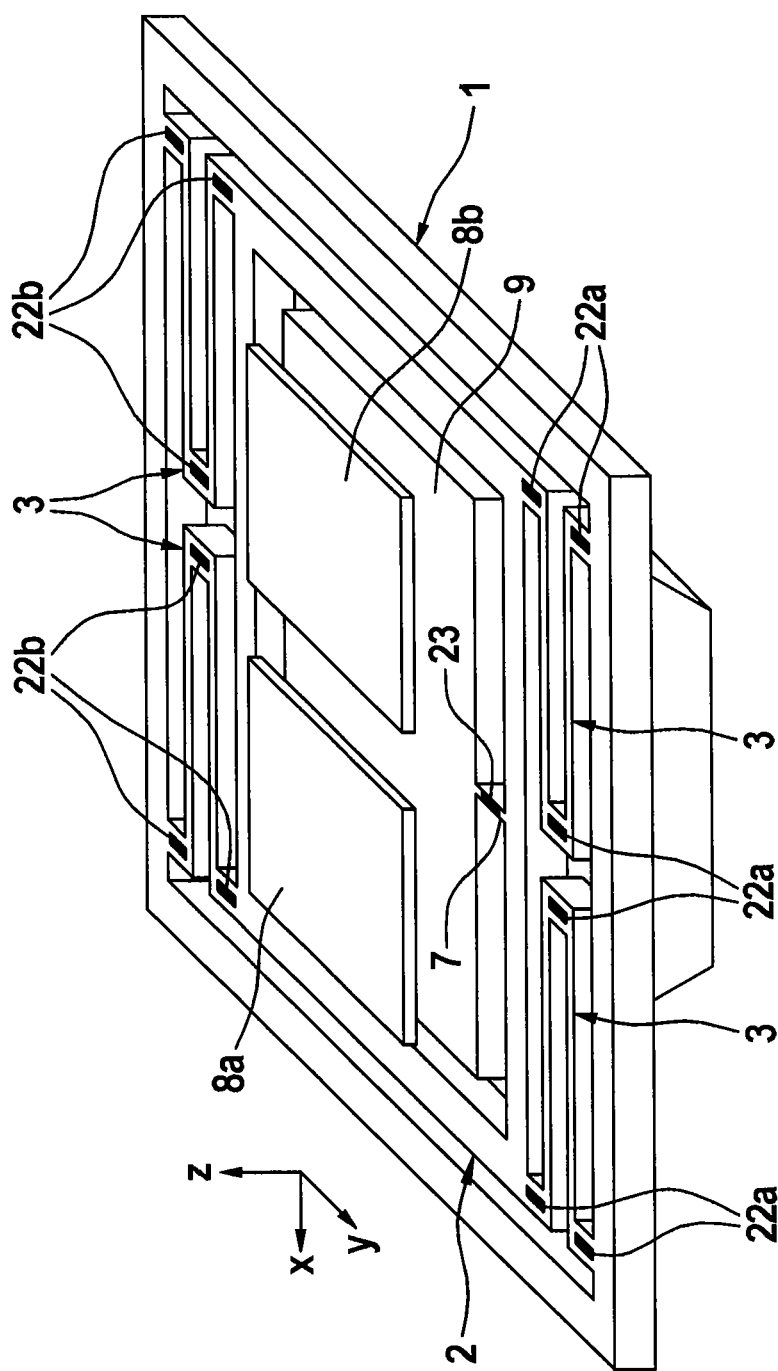
FIG. 15 shows the exemplary suspension of a frame by means of spring elements which have piezosensitive elements as reading devices.

FIG. 15 shows an exemplary embodiment of an acceleration sensor comprising a substrate frame 1, a frame 2, a seismic mass 9, which is suspended on the frame 2 by means of the torsion spring 7, and electrodes 8a and 8b, interacting with the seismic mass 9 as reading device. For example, the frame 2 is suspended on the substrate 1 by means of spring elements 3 which have piezosensitive elements 22a and 22b as reading devices, which are each embodied, for example, as piezoresistive regions by doping the corresponding surface of the spring element 3 thereon. The deflection of the frame 2 in the y direction is detected by means of these piezosensitive elements 22a and 22b. Additional comb structures composed of reading devices are not required.

Figure 16:
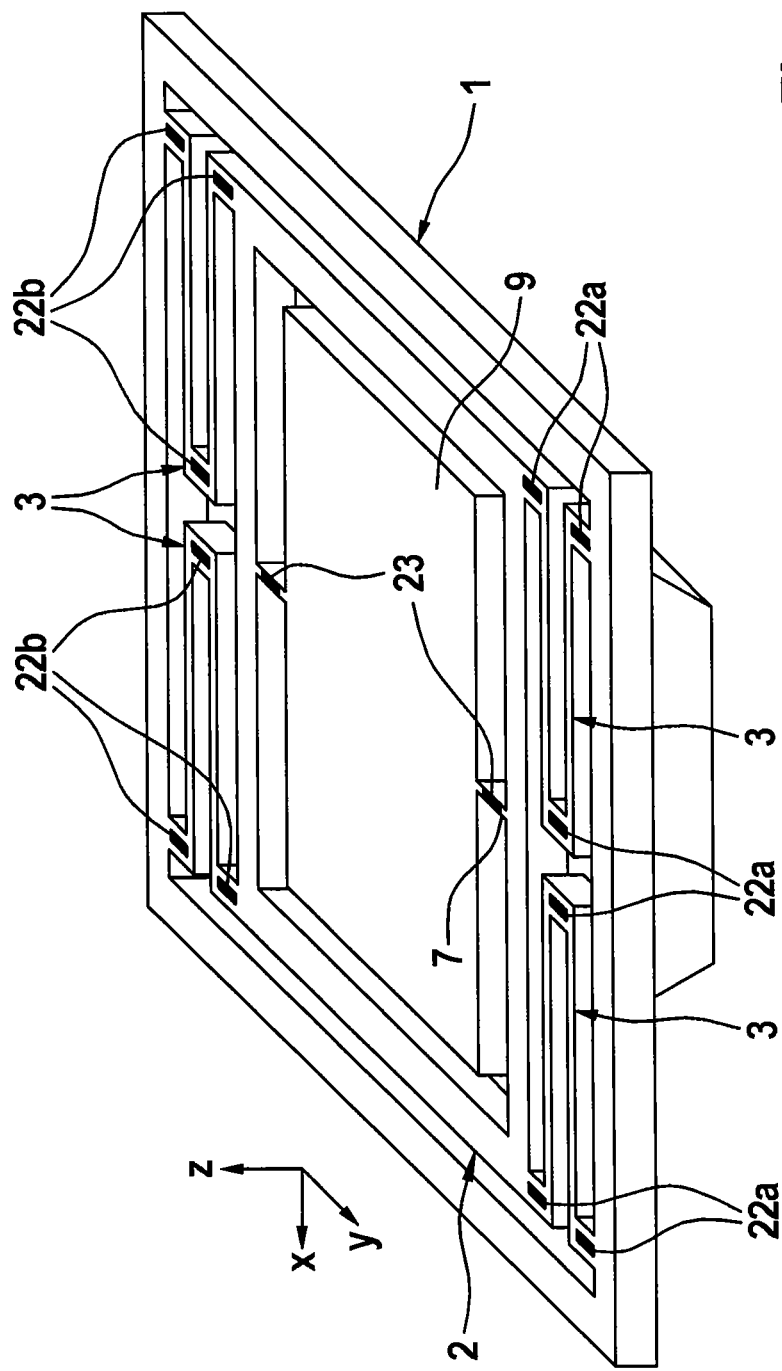
FIG. 16 shows an exemplary embodiment whose seismic mass is suspended by means of a torsion spring which also has piezosensitive elements.
Figure 17:
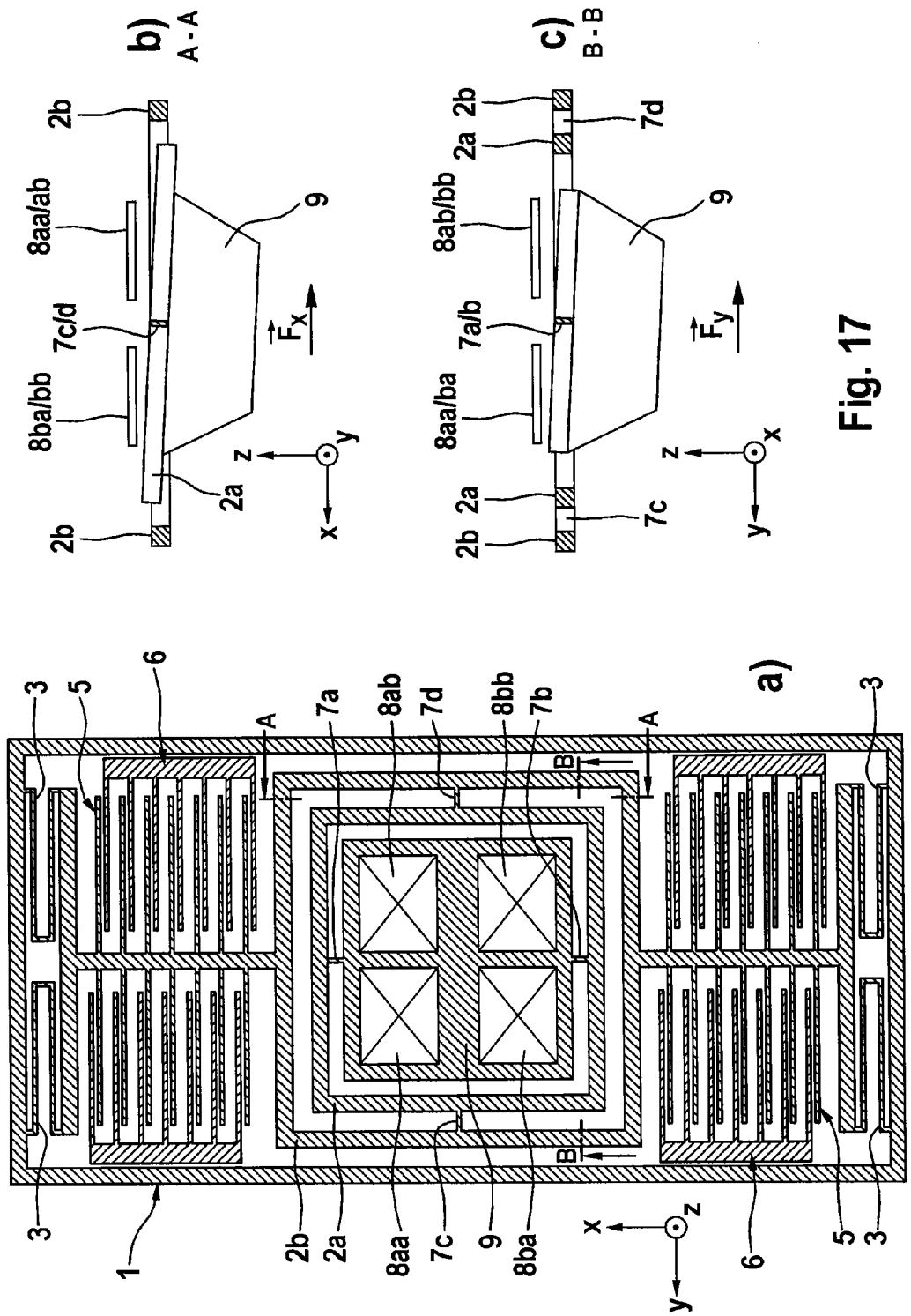
FIG. 17 shows an exemplary acceleration sensor which has an additional frame which is suspended on a first frame by means of torsion springs.

In the case of the exemplary acceleration sensor illustrated in FIG. 16, the torsion spring 7 additionally has, in contrast to the exemplary embodiment shown in FIG. 15, piezosensitive elements 23, for which reason the electrodes 8a and 8b from FIG. 15 are no longer necessary since rotational deflections of the seismic mass 9 are detected by means of the piezosensitive elements 23.

FIG. 17a) shows an exemplary acceleration sensor in which a first frame 2b is suspended on the substrate frame 1 by means of spring elements 3. In the internal region of the first frame 2b, an additional frame 2a is suspended on the first frame 2b by means of the torsion springs 7c and 7d. The seismic mass 9 is suspended on the additional frame 2a by means of the torsion springs 7a, 7b. Here, the seismic mass 9 is assigned four electrodes 8aa, 8ab, 8ba and 8bb. Rotational deflections of the seismic mass 9 about the x and y axes can be detected by means of these electrodes. The exemplary acceleration sensor can detect high G accelerations in the x direction, and low G accelerations in the x and y directions. In FIG. 17b), the acceleration sensor is illustrated in a section with respect to a plane parallel to the x-z plane by the straight line A-A, and in FIG. 17c) correspondingly with respect to a plane parallel to the y-z plane by the straight line B-B.

Alternatively, in an exemplary embodiment which is not illustrated, the torsion springs 7c and 7d are of relatively stiff design, as a result of which the additional frame 2a is utilized as a high G element. For this, the spring elements 3 and comb structures 5, 6 are eliminated in this exemplary embodiment, as a result of which the first frame 2b is rigidly connected to the substrate 1.

The invention claimed is:

1. A micromechanical acceleration sensor comprising:
   at least one substrate;
   a first comb structure;
   an airbag sensor including at least a first frame including a second comb structure is suspended on the substrate by at least one spring element, and is deflected with respect to the substrate when a first acceleration greater than a first acceleration threshold of 25 g acts in a first axis, such that the second comb structure moves with respect to the first comb structure thereby allowing the sensor to sense movement in the first axis; and
   an electronic stability program sensor including at least a first seismic mass which is suspended on the first frame or an additional frame by at least one torsion spring element, and is deflected rotationally with respect to the first frame or the additional frame when a second acceleration less than a second acceleration threshold of 10 g acts in a second axis perpendicular to the first axis, such that the first seismic mass moves with respect to at least one electrode thereby allowing the sensor to sense movement in the second axis.

2. The acceleration sensor as claimed in claim 1, wherein at least the first seismic mass is suspended on the first frame or the additional frame by at least one torsion spring.

3. The acceleration sensor as claimed in claim 2, wherein the first frame is suspended in such a way that the deflection which is caused by the first acceleration has a direction which is substantially parallel to a torsion axis of a torsion suspension of the first seismic mass.

4. The acceleration sensor as claimed in claim 1, wherein the first frame or the additional frame is suspended on another frame or the substrate by at least one torsion spring.

5. The acceleration sensor as claimed in claim 1, wherein at least the first seismic mass is suspended eccentrically with respect to a mass center of gravity of the first seismic mass.

6. The acceleration sensor as claimed in claim 1, wherein a base surface of the substrate is oriented parallel to an x-y plane of a Cartesian coordinate system (x, y, z), and the first frame is suspended on the substrate such that the first frame can be deflected in an x-direction or a y-direction, wherein the first seismic mass is suspended on the first frame or the additional frame such that the first seismic mass can be deflected at least in a z-direction, and the acceleration sensor has at least two electrodes which are arranged essentially parallel to the x-y plane and are assigned to the first seismic mass as a reading device.

7. The acceleration sensor as claimed in claim 6, wherein at least one of the electrodes is arranged in the z-direction above the first seismic mass, and at least one other of the electrodes is arranged in the z-direction below the first seismic mass.

8. The acceleration sensor as claimed in claim 1, wherein at least the first seismic mass and in addition a second seismic mass is suspended on the first frame.

9. The acceleration sensor as claimed in claim 6,
   wherein said acceleration sensor comprises a first frame which is suspended on the substrate in such a way that the first frame is configured to be deflected in the x-direction,
   wherein the acceleration sensor additionally has a second frame which is arranged in an internal region of the first frame and is suspended thereon in such a way that the second frame is configured to be deflected in the y-direction, and wherein at least one seismic mass, which is suspended on the second frame by at least one torsion spring and is configured to be deflected in the z-direction, is arranged in the internal region of the second frame.

10. The acceleration sensor as claimed in claim 9, wherein said acceleration sensor has four seismic masses which are each suspended on the second frame, wherein the second frame comprises an external frame segment and an internal frame segment, and, in each segment, two seismic masses are suspended with a torsion axis substantially parallel to an x-axis and, in each segment, two seismic masses are suspended with a torsion axis substantially parallel to a y-axis.

11. The acceleration sensor as claimed in claim 6, wherein at least the first seismic mass has, at least on the first seismic mass surface lying opposite the electrodes, trenches which are each formed substantially parallel to one another.

12. The acceleration sensor as claimed in claim 1, wherein the at least one spring element on which the first seismic mass or the first frame is suspended, and/or at least one torsion spring on which the first seismic mass or the first frame is suspended, has/have at least one piezo-sensitive element.

13. An acceleration sensor, wherein said sensor comprises two acceleration component sensors as claimed in claim 1 which have a common substrate, wherein the two acceleration component sensors are arranged substantially orthogonally to one another and together form an integrated acceleration sensor.

14. A method for manufacturing the acceleration sensor of claim 1, wherein micromechanical elements are formed by at least one manufacturing process for manufacturing micromechanical systems from a substrate which is composed of crystalline silicon or a plurality of layers of semiconductor material and/or metal/metals.

15. The use of the acceleration sensor as claimed in claim 1 in motor vehicles.

16. The use of the acceleration sensor as claimed in claim 1 in motor vehicles as a combined, integrated airbag/ESP sensor.

* * * * *